US012743221B2

(12) United States Patent
Xu et al.

(10) Patent No.: US 12,743,221 B2
(45) Date of Patent: Sep. 22, 2026

(54) VEHICLE DATA STORAGE METHOD AND VEHICLE DATA STORAGE SYSTEM

(71) Applicant: DENSO CORPORATION, Kariya-city (JP)

(72) Inventors: Xin Xu, Kariya-city (JP); Hayato Sakamoto, Kariya-city (JP)

(73) Assignee: DENSO CORPORATION, Kariya-city (JP)

(*) Notice: Subject to any disclaimer, the term of this patent is extended or adjusted under 35 U.S.C. 154(b) by 298 days.

(21) Appl. No.: 18/308,585

(22) Filed: Apr. 27, 2023

(65) Prior Publication Data

US 2023/0259293 A1 Aug. 17, 2023

Related U.S. Application Data

(63) Continuation of application No. PCT/JP2021/039251, filed on Oct. 25, 2021.

(30) Foreign Application Priority Data

Nov. 9, 2020 (JP) ................................ 2020-186669

(51) Int. Cl.
*G06F 3/06* (2006.01)

(52) U.S. Cl.
CPC ............ *G06F 3/064* (2013.01); *G06F 3/0604* (2013.01); *G06F 3/0679* (2013.01)

(58) Field of Classification Search
CPC ...... G06F 3/064; G06F 3/0604; G06F 3/0679; H04L 9/3218; H04L 9/3297; H04L 2209/463
See application file for complete search history.

(56) References Cited

U.S. PATENT DOCUMENTS 11,893,552 B2 * 2/2024 Zhao .................... G06Q 20/065
2019/0197886 A1 6/2019 Kanehara et al.
2019/0268138 A1 * 8/2019 Mankovskii ......... G06Q 20/065
2020/0052884 A1 * 2/2020 Tong ..................... H04L 9/3297
2020/0192886 A1 * 6/2020 Mishra ................ G06F 16/2365
2021/0067513 A1 * 3/2021 Hassani .............. H04W 12/009
2021/0081403 A1 * 3/2021 Tian .................... G06F 16/2365
2021/0135847 A1 * 5/2021 Manevich ........... G06F 16/9014
2021/0135867 A1 * 5/2021 Zeng ......................... H04L 9/50
2021/0258142 A1 8/2021 Ishigaya et al.
2022/0158836 A1 * 5/2022 Li .......................... G06Q 50/18
2022/0191038 A1 * 6/2022 Endo ..................... H04L 9/3263
2023/0245117 A1 * 8/2023 Higgins .................... H04L 9/50
705/39

* cited by examiner

*Primary Examiner* — Joseph L Greene
(74) *Attorney, Agent, or Firm* — Precision Patents, P.C.

(57) ABSTRACT

A vehicle data storage method implemented by each of a plurality of nodes includes: generating, as a new block, a block to be connected to the blockchain; verifying, using a common key, validity of a new block generated by, and distributed from, one of other nodes when requested by the one of the other nodes and transmitting a verification result to at least the one of the other nodes; connecting the new block to the blockchain when a majority of the plurality of nodes determines that the new block is valid; and if two new blocks are generated by two nodes and verification requests on the two new blocks are made at a substantially same time, re-transmitting, by at least one of the two nodes, a verification request at random or when a predetermined time has elapsed.

12 Claims, 5 Drawing Sheets

VEHICLE DATA STORAGE METHOD AND VEHICLE DATA STORAGE SYSTEM

CROSS REFERENCE TO RELATED APPLICATIONS

The present application is a continuation application of International Patent Application No. PCT/JP2021/039251 filed on Oct. 25, 2021, which designated the U.S. and is based on and claims the benefit of priority from Japanese Patent Application No. 2020-186669 filed on Nov. 9, 2020, and the entire disclosure of the above application is incorporated herein by reference.

TECHNICAL FIELD

The present disclosure relates to technology for storing vehicle data using blockchain technology.

BACKGROUND

A technique for storing vehicle data on the cloud has been known. Also, in recent years, attention has been paid to a system that secures the credibility of stored data using blockchain technology.

PoW (Proof of Work) is known as a typical blockchain consensus algorithm. The consensus algorithm such as PoW stipulates conditions for connecting new blocks to the blockchain.

In a PoW-type blockchain system, a block is approved to be connected to a blockchain if its hash value calculated based on the hash value of the previous block, transactions such as transaction data, and a nonce value as a variable satisfies a predetermined condition. In such a PoW-type blockchain system, multiple nodes called miners conduct a search for finding a nonce value so that the hash value satisfies the above-mentioned specific conditions (hereinafter, referred to as a proper nonce value), and the rewards are paid to the miner that first finds the nonce value.

In a PoW-type blockchain system, when two blocks with proper nonce values are generated at the same time, a fork, in which the blockchain diverges, may occur. Since the blockchain should be a single line, if a fork occurs, the shorter chain is invalidated. As a result, blocks that belong to the shorter chain will be discarded. In general, in a PoW-type blockchain system, the difficulty of finding an appropriate nonce value is set high in order to avoid an occurrence of the fork. As a result, in PoW-type blockchains, the burden for computing required to find a nonce value is very high, and thus an amount of energy due to power consumption is increased.

In view of this, there has been also known a system where the validity of data is secured by introducing privileged nodes instead of finding nonce values by all participant miners and an occurrence of the branching of the chain (so-called fork) is avoided. More specifically, one or more privileged nodes generate blocks signed with a private key and transmit them to the network. Ordinary nodes connected to the network have a public key corresponding to the above private key and connect them to the blockchain if the signature value of each of the blocks distributed from the privileged nodes is verified using the public key.

SUMMARY

One aspect of the present disclosure is a vehicle data storage method for storing, using a blockchain formed of a plurality of blocks, data collected by a plurality of nodes, each of the plurality of nodes being configured to communicate with each other and having a common key which is commonly owned key information. The method, implemented by each of the plurality of nodes, includes: generating, as a new block, a block to be connected to the blockchain, each of the plurality of blocks including transactions as storage target data and a signature value generated using a part of a previous block and the common key, the new block including a new signature value generated using a part of a last block located at an end of the blockchain and the common key; requesting other nodes of the plurality of nodes to verify the new block by distributing the new block to the other nodes upon generating the new block;

verifying, using the common key, validity of a new block generated by, and distributed from, one of the other nodes when requested by one of the other nodes and transmitting a verification result to at least the one of the other nodes that requested for verification; connecting the new block to the blockchain when a majority of the plurality of nodes determines that the new block is valid; and if two new blocks are generated by two nodes among the plurality of nodes and verification requests on the two new blocks are made by the two nodes at a substantially same time, re-transmitting, by at least one of the two nodes, a verification request at random or when a predetermined time has elapsed.

DESCRIPTION OF EMBODIMENTS

Figure 1:
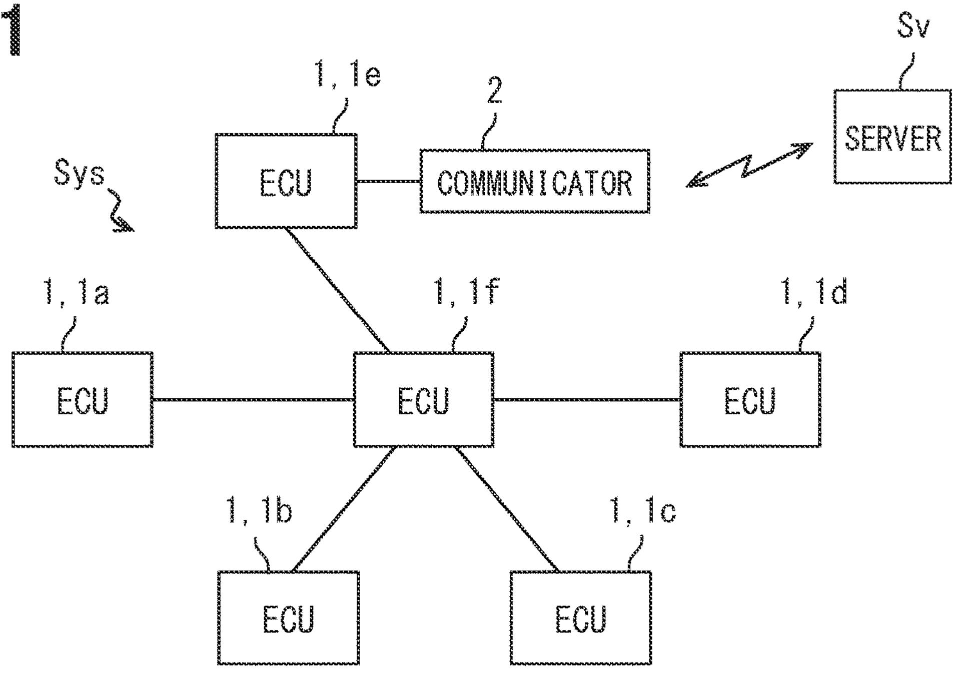
FIG. 1 is a diagram showing an example of an overview of a vehicle data storage system.

To begin with, a relevant technology will be described only for understanding the following embodiments.

In a configuration for uploading vehicle data to the cloud as described above, it is necessary to ensure that the uploaded data has not been tampered. This is because if the tampered data is used, the system/service using the vehicle data may not operate normally. It should be noted that it is necessary to ensure that stored data has not been tampered, not only when the vehicle data is stored on the cloud, but also when the vehicle data is locally stored in a storage medium mounted in the vehicle.

In response to this issue, when vehicle data is stored as a block using blockchain technology, it is expected to increase the credibility of data uploaded to the cloud or stored locally in the vehicle. However, the PoW-type blockchain system requires a huge amount of computing, so it would take a long time to perform data storage process. If computational resources with high-performance processors are used, computing time can be shortened. However, the cost will increase.

Also, in PoW-type blockchains, if multiple blocks are generated almost simultaneously, a fork will occur and the shorter chain will be invalidated. Invalidating the shorter chain means discarding some vehicle data stored therein. In other words, the vehicle data that should be saved is discarded. Therefore, it is necessary to avoid an occurrence of the fork as much as possible.

By using privileged nodes system as described above, problems such as operation time and occurrence of forks may be resolved. However, if a problem occurs in the privileged nodes, the system may be inoperable. In addition, it is assumed that such privileged nodes require hardware with higher performance and security than normal nodes, which may lead to an increase in cost.

The present disclosure has been made based on the above-described circumstances, and one of objectives of the present disclosure is to provide a vehicle data storage method and a vehicle data storage system capable of ensuring the credibility of stored data while avoiding an introduction cost.

A first aspect of the present disclosure is a vehicle data storage method for storing, using a blockchain formed of a plurality of blocks, data collected by a plurality of nodes, each of the plurality of nodes being configured to communicate with each other and having a common key which is commonly owned key information. The method, implemented by each of the plurality of nodes, includes: generating, as a new block, a block to be connected to the blockchain, each of the plurality of blocks including transactions as storage target data and a signature value generated using a part of a previous block and the common key, the new block including a new signature value generated using a part of a last block located at an end of the blockchain and the common key; requesting other nodes of the plurality of nodes to verify the new block by distributing the new block to the other nodes upon generating the new block; verifying, using the common key, validity of a new block generated by, and distributed from, one of the other nodes when requested by one of the other nodes and transmitting a verification result to at least the one of the other nodes that requested for verification; connecting the new block to the blockchain when a majority of the plurality of nodes determines that the new block is valid; and if two new blocks are generated by two nodes among the plurality of nodes and verification requests on the two new blocks are made by the two nodes at a substantially same time, re-transmitting, by at least one of the two nodes, a verification request at random or when a predetermined time has elapsed.

According to the above method, blocks that have been validated by the principle of majority are allowed to be connected to the blockchain. Accordingly, the credibility (in other words, validity) of blocks newly created by a plurality of nodes is determined, so that the credibility of data stored as a block connected to the blockchain can be increased. Also, if two new blocks generate at the same time and the verification timing overlaps with each other, at least one of the two nodes will re-transmit the verification request at random or when a predetermined time has elapsed. Therefore, it is possible to avoid an occurrence of a folk of the blockchain. In other words, it is possible to reduce the risk of data loss due to the occurrence of a fork.

In addition, according to the above configuration, each node does not need to search for a nonce value that causes the hash value to satisfy a specific condition. Therefore, the system can be realized using inexpensive computational resources with a small processing load and relatively low performance. In other words, it is possible to secure the credibility of the stored data while reducing the introduction cost.

A second aspect of the present disclosure is a vehicle data storage system for storing data using a blockchain formed of a plurality of blocks. The system includes: a plurality of nodes that are configured to collect data and communicate with each other, each of the plurality of nodes having a common key that is common key information. Each of the plurality of nodes includes: a block generation unit that is configured to generate, as a new block, a block to be connected to the blockchain, each the plurality of blocks including transactions as storage target data and a signature value generated using a part of a previous block and the common key, the new block including a new signature value generated using a part of a last block located at an end of the blockchain and the common key; a verification request unit that is configured to request other nodes of the plurality of nodes to verify the new block by distributing the new block to the other nodes upon generating the new block; a block verification unit that is configured to verify, using the common key, validity of a new block generated by, and distributed from, one of the other nodes when requested by the one of the other nodes and to transmit a verification result to at least the one of the other nodes that generated and distributed the new block; a blockchain update unit that is configured to connect the new block to the blockchain when a majority of the plurality of nodes determines that the new block is valid; and an arbitration unit that is configured to re-transmit a verification request on the new block at random or when a predetermined waiting time has elapsed if a subject node of the plurality of nodes and one of other nodes of the plurality of nodes make verification requests at a substantially same time.

A third aspect of the present disclosure is a vehicle data storage system for storing data using a blockchain formed of a plurality of blocks. The system includes: a plurality of nodes that are configured to collect data and communicate with each other, each of the plurality of nodes having a common key that is common key information. Each of the plurality of nodes includes at least one processor programmed to: generate, as a new block, a block to be connected to the blockchain, each the plurality of blocks including transactions as storage target data and a signature value generated using a part of a previous block and the common key, the new block including a new signature value generated using a part of a last block located at an end of the blockchain and the common key; request other nodes of the plurality of nodes to verify the new block by distributing the new block to the other nodes upon generating the new block; verify, using the common key, validity of a new block generated by, and distributed from, one of the other nodes when requested by the one of the other nodes and to transmit a verification result to at least the one of the other nodes that generated and distributed the new block; connect the new block to the blockchain when a majority of the plurality of nodes determines that the new block is valid; and re-transmit a verification request on the new block at random or when a predetermined waiting time has elapsed if a subject node of the plurality of nodes and one of other nodes of the plurality of nodes make verification requests at a substantially same time.

The vehicle data storage system described above is a system that executes the vehicle data storage method described above, and provides the same advantageous effects as the above method.

Hereinafter, an embodiment of the present disclosure will be described with reference to the drawings. Incidentally, the same reference numerals are assigned to the corresponding components in each embodiment, and thus, duplicate descriptions may be omitted. When only a part of the configuration is described in each embodiment, the configuration of the other embodiments described above can be applied to other parts of the configuration. Besides the explicitly described combination(s) of structural components in each of the following embodiments, the structural components of different embodiments may be partially combined even though such a combination(s) is not explicitly explained as long as there is no problem. Unspecified combinations of the configurations described in the plurality of embodiments and the modification examples are also disclosed in the following description.

FIG. 1 is a diagram showing an example of a schematic configuration of a vehicle data storage system Sys according to the present disclosure. As shown in FIG. 1, the vehicle data storage system Sys includes a plurality of ECUs 1 as nodes. "ECU" is an abbreviation for Electronic Control Unit and refers to an electronic control device. Here, in this example, six ECUs 1 are used, but the number of ECUs constituting the system is not necessarily limited to this number. The number of ECUs 1 constituting the system may be three or more, and may be four or eight. In the following, when each of the six ECUs 1 needs to be separately described from the others, the six ECUs 1 are described as ECUs 1*a* to 1*f*.

The ECUs 1 are connected to each other via a communication cable to communicate with each other. For example, each ECU 1 transmits and receives data to/from the other ECU 1 according to Ethernet (registered trademark) communication protocol. The ECUs 1*a* to 1*e* are connected to each other in a star type with, for example, the ECU 1*f* as a hub. The network is formed in a star type, but the network formation is not necessarily limited to this. As a network topology, various shapes such as a mesh type, a ring type, and a bus type can be used. A relay device (so-called router) may be interposed between two ECUs 1. Furthermore, various standards such as Controller Area Network (CAN: registered trademark) and FlexRay (registered trademark) can be used as communication standards between the ECUs 1.

Each ECU 1 can be, for example, a domain ECU that constitutes a domain architecture. The domain ECU is an ECU that comprehensively controls a plurality of ECUs which are subordinate to one functional field (that is, a domain), and can also be called a domain controller. For example, the ECU 1*a* is a body system domain ECU. The ECU 1*b* is an AD (Autonomous Driving)/ADAS (Advanced Driver-Assistance Systems) domain ECU. The ECU 1*c* is a powertrain system domain ECU. The ECU 1*d* is an infotainment system domain ECU. The ECU1*e* is a domain ECU of an external communication system. The ECU 1*f* is an ECU that serves as a gateway between domains. As another aspect, the role of the gateway may be played by the ECU 1*e*, which is the domain ECU of the external communication system. For an ECU, a domain managed by the ECU is also referred to as an target domain.

The role of each ECU 1 described above is an example, and may be changed as appropriate. Any one of the plurality of ECUs 1 may be a dedicated ECU for storing acquired data. Also, any one of the plurality of ECUs 1 may be an ECU that monitors the state of the occupant in the driver's seat using a DSM (Driver Status Monitor) or the like. The DSM is a device that detects the degree of eyelid opening and the like by performing image recognition on the face image of the occupant in the driver's seat that is captured by an infrared camera or the like.

Further, in this embodiment, as an example, the ECU 1*e* is connected to a communicator 2, and is configured to be capable of performing data communication with a server Sv outside of the vehicle via a wide area communication network. The communicator 2 is a device for carrying out wireless communication between the subject vehicle and other devices. The communicator 2 is a communication module for performing wireless communication in conformity with a predetermined wide-area wireless communication standard. As the wide area wireless communication standard here, various standards, such as long term evolution (LTE), 4G, or 5G, can be adopted. As the communicator 2, for example, a DCM (Data Communication Module) can be used. Via the communicator 2, the subject vehicle can serve as a connected car that is able to be connected to the Internet. For example, in cooperation with the communicator 2, the ECU 1*e* can transmit a backup of data stored in the ECU 1 to the server Sv on the cloud.

Note that the communicator 2 may be configured to perform wireless communication directly with another device, in other words, without a base station, in accordance with a wide-area wireless communication standard. That is, the wide area communication unit may be configured to execute cellular V2X. Further, the communicator 2 may be configured to perform direct wireless communication with other moving bodies or roadside devices existing in the vicinity of the own vehicle in conformity with a predetermined short-range communication standard. As the short range communication standard, such as a wireless access in vehicular environment (WAVE) standard defined under IEEE1609 or a dedicated short range communications (DSRC) standard, can be adopted. In the present disclosure, communication with a communication distance within several hundred meters is also referred to as short-range communication. The present disclosure is not necessarily limited to only vehicles, and may include pedestrians, bicycles, and the like. That is, the communicator 2 may be configured to function as a V2X in-vehicle device. V2X is an abbreviation of vehicle to X, and refers to a communication technology that connects vehicles to various things. The first character "V" of V2X refers to an automobile as the subject vehicle, and the "X" refers to various objects other than the subject vehicle, such as a pedestrian, a different vehicle, a road facility, a network, or a server. "X" can be understood as everything/something.

Each ECU 1 is configured to acquire data generated within the target domain and store the acquired data in a hardly-tampering state in cooperation with other ECUs 1. Next, a configuration of the ECU 1 will be described. The structure of each ECU1 for storing data is the same. That is, the following description of the ECU 1 can be applied to each of the ECUs 1*a* to 1*f*. A digital signature using a common key Ky is added to a message exchanged between the ECUs 1 so as to ensure the validity of the message.

<Structure of ECU 1>

Figure 2:
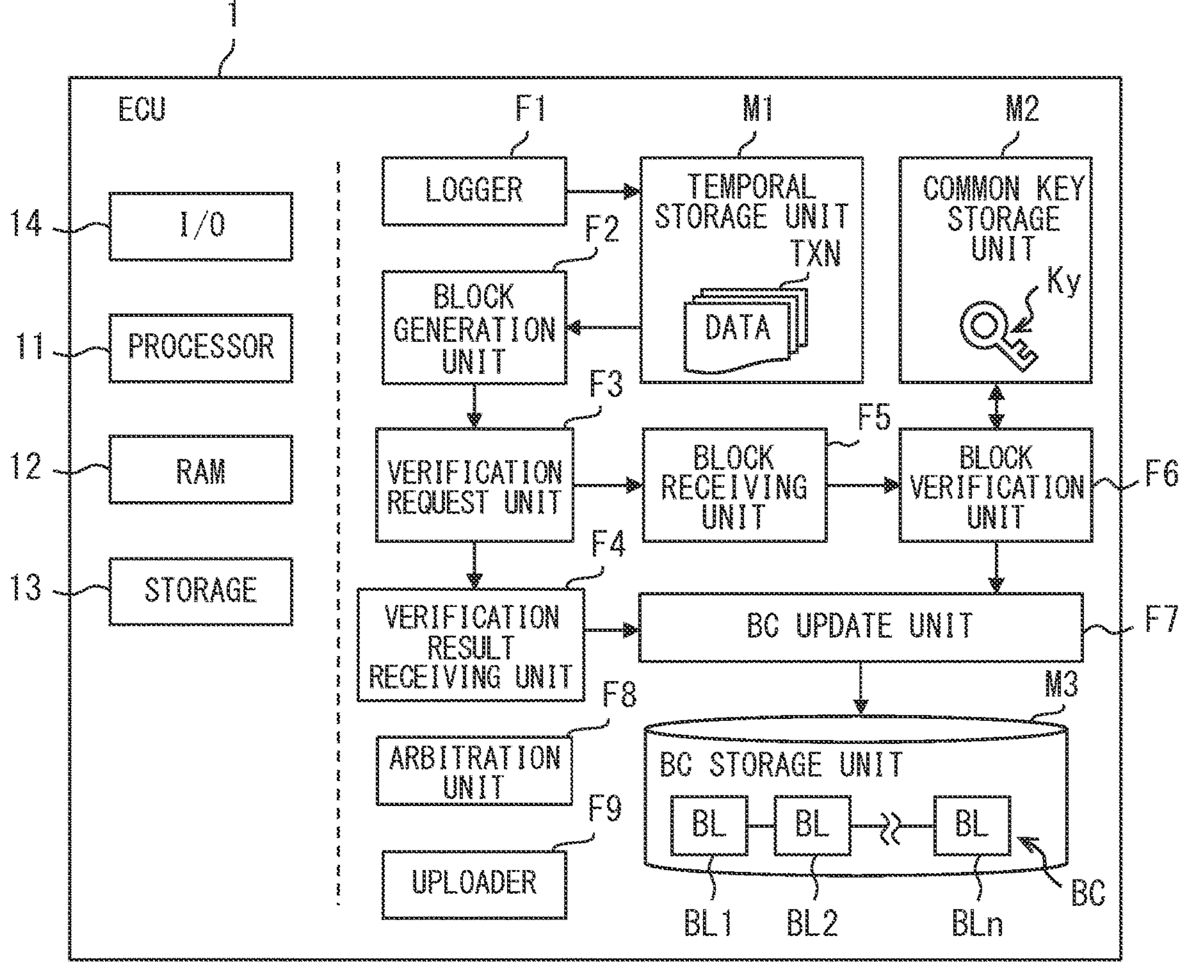
FIG. 2 is a block diagram showing a configuration of an ECU.

The ECU 1 executes a logger process of collecting and storing data, a block registration process of converting the data accumulated by the logger process into blocks and connecting them to a blockchain BC, and the like. As shown in FIG. 2, the ECU 1 mainly includes a control circuit including a processor 11, a RAM 12, a storage 13, an input/output interface 14 (IO in the figure), and the like.

The processor 11 is hardware for operational processing, which is coupled to the RAM 12, and the processor 11 is capable of executing various types of programs through access processing to the RAM 12. The storage 13 includes a non-volatile storage medium and stores various types of programs to be executed by the processor 11. The storage 13 stores at least a data storage program relating to collecting, providing and monitoring of data generated in the target domain. Execution of the data storage program by the processor 11 corresponds to execution of the vehicle data storage method corresponding to the data storage program. The input/output interface 14 is a circuit module for the ECU 1 to communicate with other devices (including sensors and ECUs) mounted in the vehicle.

Here, as an example, it is assumed that the ECU 1 uses TrustZone (registered trademark) technology so that at least two different processing areas, i.e., the normal world and the secure world, can be used together. The normal world is a normal area where operation systems and applications are executed. The Secure World is an area isolated from the Normal World. In the secure world, secured operation systems and applications for processing which requires for security are executed. Access to the secure world from the normal world is restricted by a function of the processor 11. This makes it impossible to recognize the presence of the secure world from the normal world, which ensures security for processing executed in the secure world and information stored in the secure world.

A storage area (Untrusted Storage) where data is stored in the normal world may be called normal storage. Also, a storage area (Trusted Storage) used for storing data in the secure world can be called a secure storage. The normal world and the secure world may either be physically separated from each other in hardware or be virtually separated from each other through cooperation of hardware and software. The ECU 1 temporally divides resources necessary for the execution of applications in the normal world and the secure world by utilizing the functions of context switches and the like.

<Functions of ECU1>

The ECU 1 includes various function units illustrated in FIG. 2 as functional units that are realized by the processor 11 executing a data storage program stored in the storage 13. That is, the ECU 1 includes, as functional units, a logger F1, a block generation unit F2, a verification request unit F3, a verification result receiving unit F4, a block receiving unit F5, a block verification unit F6, a blockchain update unit (hereinafter, referred to as a BC update unit) F7, an arbitration unit F8, and an uploader F9. The ECU 1 also includes a temporal storage unit M1, a common key storage unit M2, and a blockchain storage unit (hereinafter referred to as a BC storage unit) M3 as storage areas for data with different usages and security levels.

The temporal storage unit M1 is a storage area in which transactions TXN are stored. The TXN are data acquired by the logger F1 and should be stored in blocks. The temporal storage unit M1 is implemented using a part of the storage area of the RAM 12, for example. The temporal storage unit M1 can be formed in the normal world.

The common key storage unit M2 is a storage area in which a common key Ky, which is an encryption key commonly held by each ECU 1, is stored. The common key Ky is used for block generation processing and received block verification processing, as will be described later. The common key Ky is, for example, a preset fixed value. As another aspect, each ECU 1 may share the common key Ky dynamically generated by a predetermined algorithm via cryptographic communication. The common key storage unit M2 can be implemented using a part of the storage area in the storage 13, for example. The common key storage unit M2 can be formed, for example, within the secure world. The common key Ky should be stored in a storage medium that ensures a certain level of security.

The BC storage unit M3 is an area for storing the blockchain BC. The blockchain BC of the present disclosure is a dataset formed by connecting linearly a plurality of blocks to each other in a chain manner in an order of generation time. A next block includes a signature value generated using a predetermined portion of the previous block and the common key Ky in the next block. A method of generating each block will be described later. The BC storage unit M3 can be implemented using a part of the storage area of the RAM 12 or the storage 13, for example. The BC storage unit M3 can be formed, for example, in the normal world. Note that BL in FIG. 2 is an abbreviation for block, and BL1 indicates the top block of the blockchain BC. Also, BL2 indicates the second block from the front.

The logger F1 is a functional unit that stores, in the temporal storage unit M1, various data generated within the target domain including the ECU1 itself. The logger F1 is electrically connected to a communication bus of an in-vehicle communication network formed within the target domain, for example. The logger F1 acquires various data generated by the ECUs, sensors, etc. that constitute the target domain through the communication bus. For example, the logger F1 selectively extracts preset data from the data sequentially output to the communication bus from the in-vehicle sensors and ECUs constituting the responsible domain. Then the logger F1 stores it in the temporal storage unit M1 as a transaction TXN. That is, the logger F1 collects data to be blocked and saved. The logger F1 may be, for example, an application running in the normal world.

The block generation unit F2 generates blocks to be connected to the blockchain BC based on the transactions TXN accumulated in the temporal storage unit M1. A block is a unit of stored data that collectively stores data within a specified size, specified number, or specified time. The blocks may also be referred to as data blocks. The block generation unit F2 creates one block based on the transactions TXN stored in the temporal storage unit M1 when a predetermined block generation condition is met.

Figure 3:
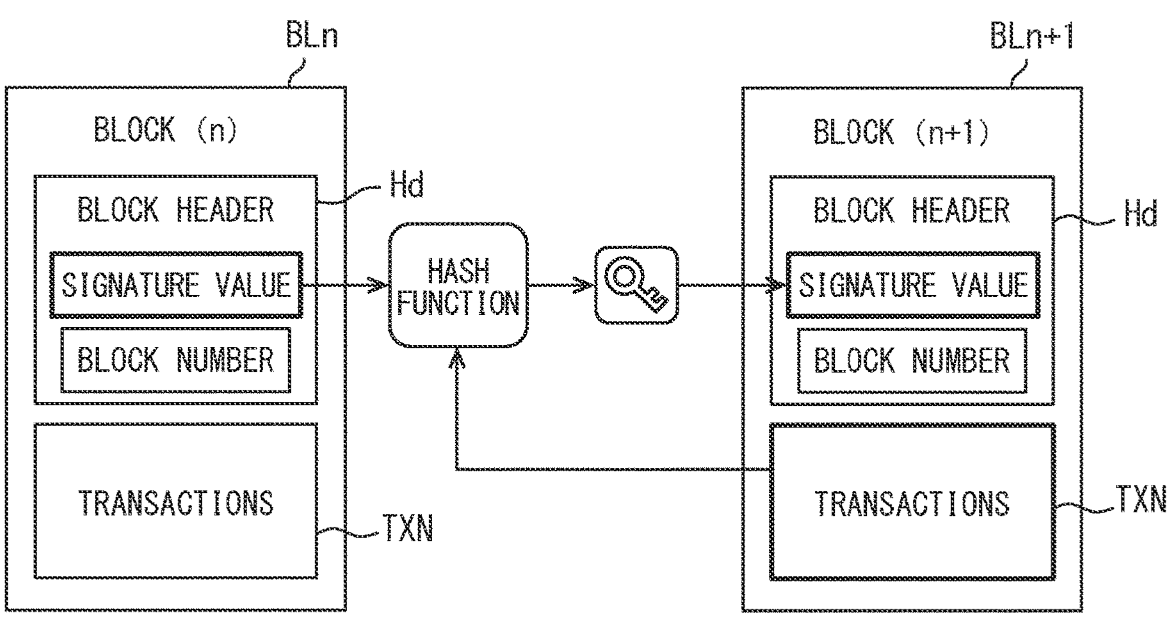
FIG. 3 is a diagram for explaining the configuration of blocks in a blockchain.

Each block contains a block header Hd and the transactions TXN, for example as shown in FIG. 3. The block header Hd contains, for example, a block number and a signature value. The block number is information indicating the order of the block from the front in the blockchain BC. The block number is also called a block height. The signature value included in each block is a value (character string) obtained by encrypting, using the common key Ky, a hash value of original data formed of the transactions TXN of the current block and the signature value of the preceding block.

The block header Hd may include, in addition to the signature value and the block number, source information indicating the ECU 1 that is a source of generating the block, a time stamp indicating the time of generation, and the like. In addition, the block header Hd may include identification information of the ECU 1 that guaranteed the validity of the block in a verification process, which will be described later. The block BLn shown in FIG. 3 indicates the last block BLn which is currently located at the end of the blockchain BC. The block BLn+1 indicates a newly created block (that is, a new block). The block header Hd can be understood as, for example, a data field in the block and contain data other than the transactions TXN.

The block generation unit F2 has a function of calculating the signature value using the common key Ky. When generating a new block, the block generation unit F2 refers to the final block BLn stored in the BC storage unit M3, and acquires the signature value of BLn of the final block as a previous signature value. Then, by encrypting the hash value obtained by inputting the previous signature value and the transactions TXN to be stored into a predetermined hash function with the common key Ky, a new signature value is generated as the signature value for the new block. Such a signature value can be interpreted in one aspect as an electronic signature.

Hereinafter, for convenience, the hash value obtained by inputting the previous signature value and the transactions TXN to be stored into a predetermined hash function is also referred to as an original data hash value. Various functions such as SHA256, SHA-1, SHA-512, SHA-3, MD-5, and RIPEMD160 can be used as the hash function. SHA stands for Secure Hash Algorithm. MD stands for Message Digest algorithm. RIPEMD stands for Race Integrity Primitive Evaluation Integrity Primitives Evaluation Message Digest. Each ECU 1 is configured to generate and verify a signature value using a common hash function.

Also, the block generation unit F2 calculates a value by increasing the block number of the final block BLn by one as a newly generated block number. Then, a block is generated in which the new signature value and the current block number are included in the block header Hd. Hereinafter, when a new block is generated by the block generation unit F2 but no consensus for connecting the new block to the blockchain is reached on the new block, the new block may be also referred to as a verification target block.

Note that the signature value included in the block may be obtained by encrypting the previous signature value and the transactions TXN to be stored with the common key Ky. That is, the original data that is the source of the signature value may be the previous signature value and the transactions TXN themselves to be stored. Furthermore, the original data of the signature value may include the transactions TXN of the final block BLn. Alternatively, the block generation unit F2 may generate a new signature value using a bit string at a predetermined position of the transaction TXN and the previous signature value without using all of the previous or new transaction TXN. For example, the block generation unit F2 may create a signature value based on the 5th to 10th bits at the beginning or end of the transaction TXN. In addition, the original data of the signature value may be only the previous signature value. Also, the original data may be only a bit string at a predetermined position of transaction TXN. However, from the viewpoint of tampering resistance of the transaction TXN, it is preferable that the original data directly or indirectly includes at least a part of the transaction TXN, more preferably all elements of the transaction TXN to be included in the final block or new block. In addition, other items included in the block, such as the block number, may be included in the original data. Each ECU 1 is configured to generate a signature value through a common procedure.

Such a block generation unit F2 generates a block in response to satisfying a predetermined block generation condition. For example, the block generation condition is met when a certain amount of time has passed since the block was generated last time, a specified amount of transactions TXN is stored in the temporal storage unit M1, or a predetermined vehicle event occurs. The vehicle event includes, for example, turning on or off of the driving power source, starting automatic driving, and performing parts replacement. Alternatively, a block may be generated upon receiving an upload instruction from the server Sv. Moreover, the block generation unit F2 may generate a block upon receiving an instruction to generate a block from the other particular ECU1. For example, the block generation unit F2 periodically creates blocks when the power source for traveling is on. The traveling power source here is a power source for the subject vehicle to travel, and refers to an ignition power source when the vehicle is a gasoline vehicle. If the subject vehicle is an electric vehicle or a hybrid vehicle, the traveling power source refers to a system main relay.

The verification request unit F3 is configured to perform a verification request process, which is a process of requesting other ECUs 1 to verify the block generated by the block generation unit F2. The verification request unit F3 transmits the verification target block including the new signature value to the other ECUs 1 upon the block generation unit F2 generating the block. Note that the verification request unit F3 may transmit the verification target block to each ECU 1 without any notice. Alternatively, the verification request unit F3 may exchange a predetermined message with each ECU 1 in advance, and then transmit the verification target block after obtaining approval to transmit. In the following, a request for verifying the verification target block is simply referred to as a verification request. Transmitting a verification request includes transmitting a newly generated block as the verification target block.

The verification result receiving unit F4 is configured to receive the verification results on the verification target block from the other ECUs 1. The verification results received by the verification result receiving section F4 are output to the BC update unit F7.

The block receiving unit F5 receives the verification target block transmitted from the other ECUs 1. The block receiving unit F5 outputs the received verification target block to the block verification unit F6. Such a block receiving unit F5 corresponds to a configuration for receiving verification requests from the other ECUs. Note that the verification target block is a block that has not been determined whether to be added to the blockchain BC. Thus, the verification target block can be called a pending block. Each ECU 1 registers, as the pending block, the verification target block received from the other ECUs 1 or a block generated by the ECU 1 for which verification results have not yet been received from other ECUs 1.

Note that, when a pending block exists, the verification request unit F3 does not transmit a verification request in order to avoid occurrence of branching (so-called fork) of the blockchain BC. However, there may be a minute time difference due to communication processing or the like from a timing another ECU 1 generates a block to a timing a verification request for that block is received from the other ECU 1. Therefore, for example, when a plurality of ECUs 1 generate new blocks almost simultaneously (that is, at the same time), two or more of the pending blocks exist. In such a case, the arbitration unit F8 performs arbitration to cause the number of pending blocks to be 1 or less, as will be described later.

Based on the verification request from another ECU 1, the block verification unit F6 verifies the verification target block received by the block receiving unit F5 using the common key Ky. For example, the block verification unit F6 decrypts the signature value of the received block using the common key Ky and extracts the original data hash value. The block generation unit F2 refers to the final block BLn stored in the BC storage unit M3, and acquires the signature value of BLn of the final block as a previous signature value. Next, by inputting the previous signature value and the transactions TXN included in the verification target block into a hash function, the original data hash value for verification is generated. Then, when the original data hash value for verification and the original data hash value extracted from the verification target block match each other, the block is determined to be valid (in other words, appropriate). On the contrary, when the original data hash value for verification and the original data hash value extracted from the verification target block do not match each other, the block is determined to be invalid (in other words, inappropriate).

The verification process described above corresponds to the process of confirming the consistency of the electronic signature and block. Specifically, it corresponds to determining whether there is a contradiction between the block number and the previous signature value. Note that the method for verifying the validity of the verification target block is not necessarily limited to the above method. For example, the validity of a block may be judged according to whether a bit string obtained by decrypting an encrypted block using the common key Ky has a predetermined relation with the previous signature value.

When the block verification unit F6 determines that the received verification target block is a valid block, the block verification unit F6 transmits an approval message to the verification requesting ECU. The approval message is a message that approves the block to be connected to the blockchain BC. Here, the approval message is also described as an ACK. On the contrary, if the block verification unit F6 determines that the received verification target block is an invalid block, the block verification unit F6 transmits a non-approval message to the verification requesting ECU 1. The non-approval message is a message that does not approve the block to be connected to the blockchain BC. In this embodiment, the non-approval message is also referred to as a NACK. The ACK and NACK preferably include target information indicating which block the verification result is made, verifier information indicating which ECU 1 performed the verification process (that is, the transmitter of the verification result), and the like.

The BC update unit F7 is configured to update the blockchain BC based on the verification result of the block verification unit F6 and the verification result information received by the verification result receiving unit F4. The BC update unit F7 connects a block, which is recognized as valid by the majority (51% or more) of the plurality of ECUs 1 constituting the system, to the blockchain BC. Details of the BC update unit F7 will be described later.

The arbitration unit F8 is configured to detect a block collision and, if a block collision is detected, perform arbitration to prevent a fork from occurring. Block collision here means that blocks to be verified are transmitted from multiple ECUs 1 at the substantially same time. Alternatively, block collision refers to an event in which another block is newly generated during the process of verifying a block. The block collision can be said to be a verification request collision. Furthermore, the block collision can also be rephrased as multiple blocks generation.

For example, the arbitration unit F8 determines that a block collision occurred when another verification target block arrives even though there is a pending block. Further, when the ECUs 1 are configured to share the summary of pending blocks with each other, it may be determined that a block collision occurred if the pending blocks for the ECUs 1 do not match each other. Alternatively, the arbitration unit F8 may detect the block collision based on the fact that the ACK or the NACK for a block different from the pending block held by the arbitration unit F8 is transmitted from another ECU 1.

When the arbitration unit F8 detects a block collision, the arbitration unit F8 transmits a collision detection message, which is a message indicating that a block collision has occurred, to all other ECUs 1 or the ECUs 1 that are generating sources of the colliding blocks. The collision detection message may be transmitted by the ECU 1 that first detected the block collision among the plurality of ECUs 1. As another aspect, each ECU 1 may independently determine whether there is a block collision without sharing the situation with each other via the collision detection message.

However, it is assumed that the timing of detecting that a block collision occurred is different for each ECU 1 due to communication delay or processing delay. In view of this, it is preferable that each ECU 1 is configured to share the occurrence of the block collision with other ECUs 1 by, e.g., broadcasting the collision detection messages. If the ECU 1 as a verification requesting source can recognize the occurrence of the block collision at an early stage, it will be possible to quickly perform, e.g., retransmission control. As a result, it is possible to shorten the processing time from block generation to connection of the block to the blockchain BC.

When a block collision is detected, each ECU 1 once discards the pending block, for example. Moreover, when each ECU 1 discards the pending block, the ECU 1 may notify the block generating source of discarding the pending block. In the present embodiment, the ECU 1 corresponding to the generating source of the colliding block re-transmits the verification request when a random waiting time has elapsed. The waiting time shall be determined using random numbers to minimize the possibility of repeatedly occurring of collisions of the waiting time. Such a waiting time can be also referred to as a backoff time. For example, the waiting time may be determined by randomly selecting any of a plurality of candidate waiting time values. In addition, the waiting time may be set in advance for each ECU1. In that case, it is assumed that the waiting time of each ECU 1 is set to be different from each other. Moreover, when the block is newly added to the blockchain BC while waiting for retransmission, each ECU 1 preferably re-creates a new block based on the information of the newly added final block BLn.

The interval between waiting time candidate values is set to be longer than an estimated required verification time, which is a total estimated time required for the verification on one verification target block, more specifically the time period from a timing a verification request is transmitted from the verification request until to a timing a majority decision is obtained. For example, if the assumed total verification time is 600 ms, the set of candidate values for the waiting time may be 0 ms, 1000 ms, 2000 ms, 3000 ms, and 4000 ms. The above values are described as an example, and may be changed as appropriate according to the assumed verification time. For example, if the assumed verification time is 300 ms, the set of candidate values for the waiting time may be 0 ms, 500 ms, 1000 ms, 1500 ms, and 2000 ms.

The uploader F9 is configured to upload each block linked to the blockchain BC to the server Sv periodically or when a predetermined event occurs. Block uploading is performed in cooperation with the communicator 2. All the ECUs 1 do not need to have the uploader F9, and only some of the ECUs 1 may have the uploader F9. For example, only the ECU 1*e* connected to the communicator 2 may have the function of the uploader F9. Also, the ECU If as a gateway may be configured to perform uploading. Such an event for uploading the data of the blockchain BC includes, for example, when an upload instruction is received from the server Sv, or when a wireless LAN such as Wi-Fi (registered trademark) is available. Note that uploading the blockchain BC to the server Sv is optional and does not have to be performed.

<Block generation related processing>

Figure 4:
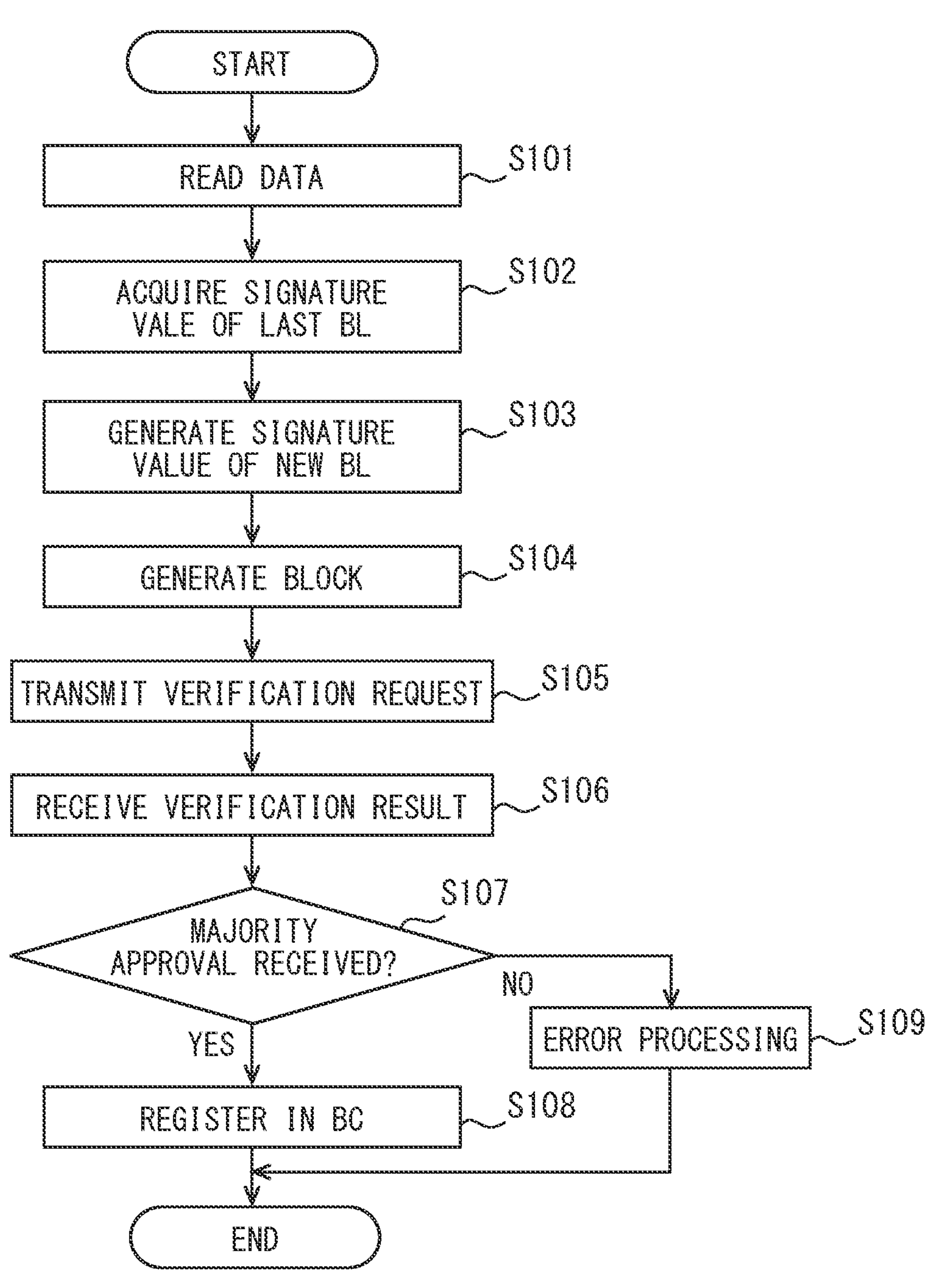
FIG. 4 is a flowchart of block generation related processing.

Here, block generation-related processing executed by the ECU 1 will be described with reference to the flowchart shown in FIG. 4. The block generation-related processing is a series of processing from generating blocks to connecting the generated blocks to the blockchain BC. The following processing is executed by each ECU1. The flowchart shown in FIG. 4 starts when a block generation condition is satisfied. For example, the flowchart shown in FIG. 4 is executed at constant intervals. As an example, the block generation related processing includes steps S101 to S109, but is not necessarily limited to these steps. The number of processing steps, the order of executing the steps, and the like in the block generation-related processing can be changed as appropriate. Data collection by the logger F1 can be executed separately, in other words, in parallel, with the processing flow shown in FIG. 4.

First, at step S101, the block generation unit F2 reads the transactions TXN stored in the temporal storage unit M1, and proceeds to step S102. The step S101 can be called a data acquisition step. At step S102, the block generation unit F2 refers to the final block BLn, which is the block connected to the end of the blockchain and acquires the previous signature value. Then, process proceeds to step S103. The step S102 can be called a previous signature value acquisition step.

At step S103, the block generation unit F2 generates an original data hash value by inputting the previous signature value obtained at step S102 and the transactions TXN obtained at step S101 into a predetermined hash function. Then, by encrypting the original data hash value with the common key Ky, a signature value for a newly created block (that is, a new signature value) is generated. When the process of step S103 is completed, the process proceeds to step S104. Note that step S103 can be called a signature generation step.

At step S104, the block generation unit F2 generates a block including the new signature value generated at step S103 and the transactions TXN obtained at step S101 as a new block, and proceeds to step S105. The step S104 can be called a block generation step.

At step S105, the verification request unit F3 transmits the block generated at step S104 as a verification target block to other ECUs 1 connected to the network, and requests the other ECUs for verification on the target block. The verification target block may be transmitted individually to the other ECUs 1 or may be transmitted at the same time. That is, the verification request unit F3 may transmit the verification request by unicasting, multicasting or broadcasting. Step S105 can be called a verification request step or an approval request step. When step S105 is completed, the process proceeds to step S106.

At step S106, the verification results are received from the ECUs 1 to which the verification request is transmitted. It should be noted that the verification result may be transmitted as, for example, an ACK indicating a positive result or a NACK indicating a negative result. If the verification results were received from all the ECUs 1 to which the verification requests were transmitted or if a predetermined waiting time has elapsed since step S105 was executed, the process proceeds to step S107. Alternatively, the process may proceed to step S107 at a timing majority decision is made, for example, a timing the ACKs are received from the majority (i.e., 51% or more) of the ECUs 1 which received the verification requests or a timing the NACKs are received from the majority of the ECUs 1 which received the verification requests. Step S106 can be called a verification result receiving step.

At step S107, it is determined whether or not the ACKs are received from the majority of the ECUs 1 that received the verification requests. Step S107 corresponds to a step of determining whether the validity of the newly created block is verified by the majority of the ECUs 1 connected to the network. If the ACKs are received from the majority of the ECUs 1 that received the verification requests, an affirmative decision is made at step S107 and the process proceeds to step S108. On the contrary, if the ACKs are not obtained from the majority of the ECUs 1 that have received the verification requests, a negative determination is made at step S107 and the process proceeds to step S109. Step S107 can be called a majority determination step.

At step S108, the BC update unit F7 connects the block newly created at step S104 to the blockchain BC and stores it in the BC storage unit M3. Then, the process terminates this flow. At step S109, the ECU 1 executes predetermined error processing. For example, the ECU 1 may re-execute the processes from step S101 as the error processing.

It should be noted that the ECU 1 may determine that an abnormality occurs therein if approvals from the majority of the ECUs are not obtained even after executing the processes from step S101 a certain number of times. Then, the ECU 1 may output an error signal to an outside. In addition, the ECU 1*e* connected to the communicator 2 may report to the server Sv that an abnormality occurred in the system upon receiving the error signal. If the ECU 1 fails to register a new block a predetermined number of times (for example, three times) in succession, the ECU 1 may provide another ECU 1 with the transactions TXN stored in the ECU 1 and request the other ECU 1 to create a block to store the transactions TXN therein. In this way, by generating a block by the other ECU 1 on behalf of the subject ECU 1, even if an abnormality occurs in the subject ECU 1, it is possible to avoid leakage of data stored in the subject ECU 1.

<Interaction Between the ECUs 1>

Figure 5:
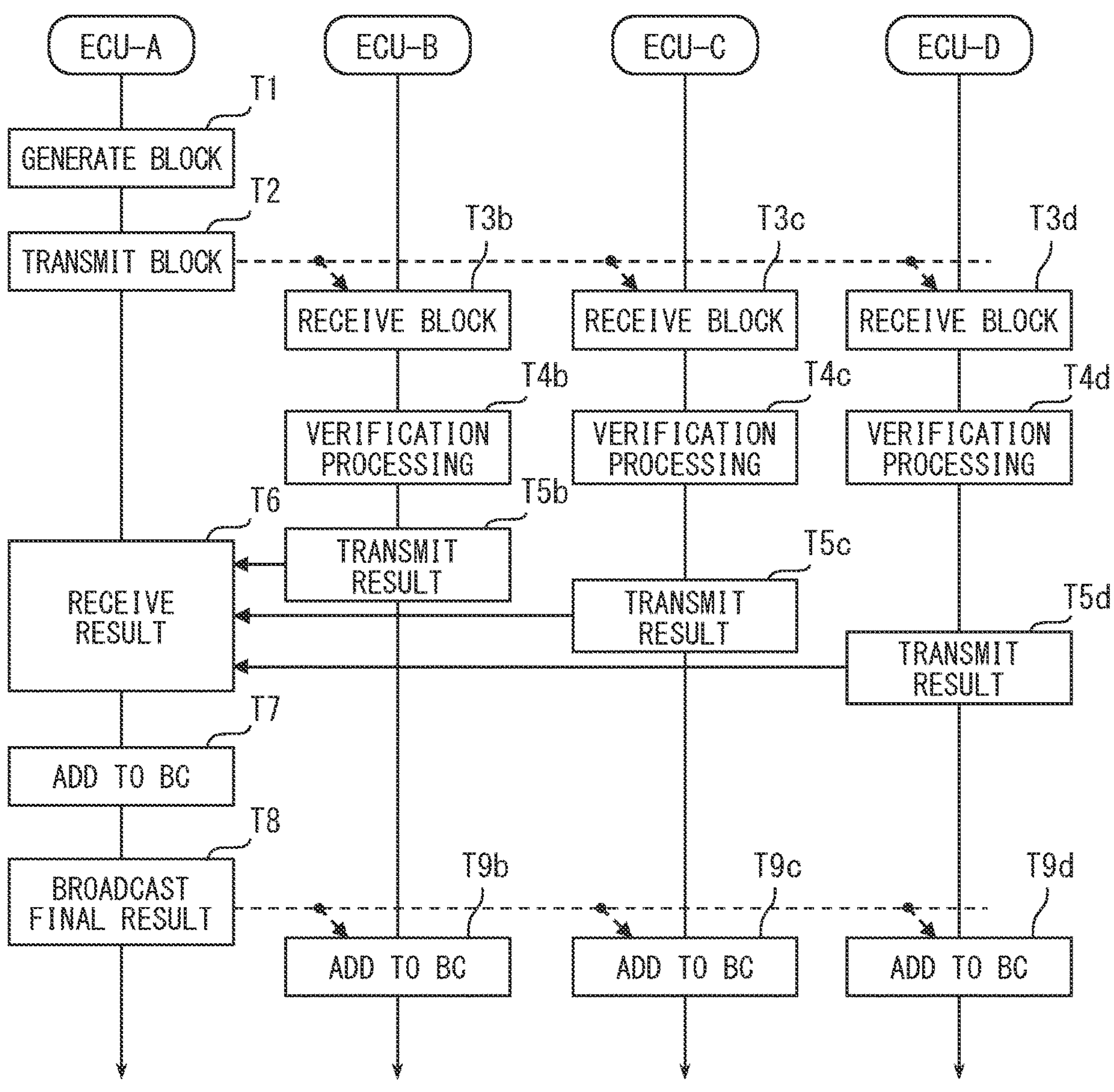
FIG. 5 is a sequence diagram showing operations of each ECU from block generation to block chain connection.

Next, the interaction between the ECUs 1 will be described using the sequence diagram shown in FIG. 5. Each of ECU-A, ECU-B, ECU-C, and ECU-D shown in FIG. 5 is different from each other. For example, ECU-A, ECU-B, ECU-C, and ECU-D can be the ECUs 1*a* to 1*d* in this order. Although only four ECUs 1 are shown in FIG. 5 due to the size of the page, as shown in FIG. 1, five or more ECUs 1 connected to the network may exist. In the example shown in FIG. 5, the ECU-A is the ECU 1 that newly generated the block and corresponds to a verification requester, which is the ECU 1 that issues the verification request, or a generator of the new block. Each of ECU-B to ECU-D corresponds to a verifier, which is the ECU 1 that verifies the block generated by the ECU-A.

First, when ECU-A generates a block (T1), it distributes the block to each of ECU-B to ECU-D and requests them to verify it (T2). Note that although FIG. 5 illustrates, as an example, broadcasting/multicasting the verification target block, the verification target block may be transmitted and received separately to/from each ECU 1. Also, ECU-A registers the block generated at step T1 as a pending block.

When each of ECU-B to ECU-D receives a block from ECU-A (T3b, T3c, T3d), each received block is registered at a pending block and verification processing for the block is executed (T4b, T4c, T4d). Then, as soon as the verification for the received block is completed, ACK/NACK as a verification result is returned to ECU-A (T5b, T5c, T5d). In FIG. 5, from the visibility viewpoint, the timings at which each ECU-B to D returns the verification results are emphatically shown to be offset from each other.

As an example, each of the ECU-B to ECU-D as a verifier transmits the verification result only to the ECU-A, but is not necessarily limited to this. Each ECU 1 may transmit the verification result of the new block to other ECUs 1 other than the verification requesting source ECU. That is, each ECU 1 may be configured to broadcast/multicast the verification result to all other ECUs 1. According to the configuration in which all each of the ECUs 1 shares the verification results from all other ECUs 1 with each other in this way, the ECUs 1 other than the block generating source ECU can also determine the validity of the pending block at the same time. As a result, it is easier to maintain a state in which the blockchains BC held by the ECUs 1 are consistent with each other.

When the ECU-A receives the verification results from the ECUs-B to D (T6), the ECU-A determines whether to connect the newly created block to blockchain BC depending on whether the majority approves the validity on the block. Here, as an example, it is assumed that ACK is returned from all the the ECU-B to D. In that case, the ECU-A stores the block generated at step T1 by connecting it to the end of the blockchain BC (T7).

As a subsequent process, for example, the ECU-A may spread the treatment of the newly created block to the other ECUs-B to D based on the plurality of verification results received at step T6 (T8). For example, the ECU-A may inform each of the ECUs-B to D that the validity is verified by the majority vote or that the validity is not verified by the majority vote. According to this configuration, each of the ECUs-B to D promptly determines whether the block transmitted from the ECU-A, which is set as a pending block, should be connected to the end of the blockchain BC held by each of the ECUs-B to D.

Further, as another aspect, if each of the ECUs-B to D is configured to transmit the verification result of the verification target block to ECUs other than the block generating source ECU, the operation can be performed as follows. That is, each of the ECUs 1 as a verifier may also finally determine the validity of the verification target block by a majority vote with a population formed of the verification results of other ECUs and the own verification result. When the verification target block is determined to be a valid block by the majority vote, the verification target block is connected to the blockchain BC held by each of the ECUs-B to ECU-D. The blockchain of each of the ECUs 1 can be also updated quickly according to such process.

<Collision Arbitration Processing>

Figure 6:
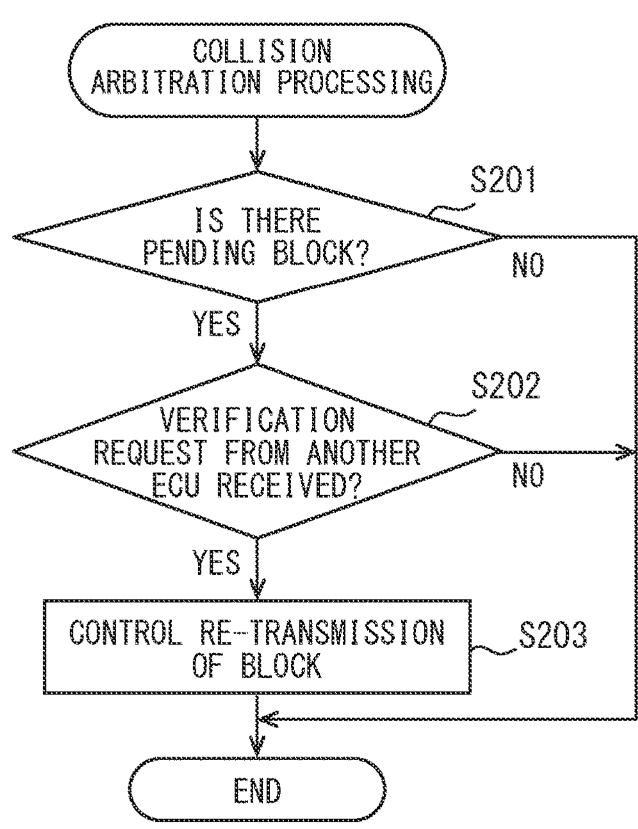
FIG. 6 is a flowchart illustrating an example of processing for detecting a block collision.

FIG. 6 is a flowchart showing an example of the operation of the arbitration unit F8. The processes as the collision arbitration processing shown in FIG. 6 includes steps S201 to S203. However, the number of processing steps included in the collision arbitration process, the order of execution, etc. can be changed as appropriate. The flowchart shown in FIG. 6 is executed, for example, by the arbitration unit F8 of each of the ECUs 1. Each of the arbitration units F8 sequentially starts the processing flow shown in FIG. 6 at predetermined collision monitoring intervals. The collision monitoring interval is set to substantially a short time, such as 50 milliseconds, compared to an assumed total verification time. This is because if the collision monitoring interval is set long, the verification of each block progresses despite the occurrence of block collisions, and therefore branching (so-called fork) of the blockchain may occur. It should be noted that the ECU 1 may be configured to sequentially execute the collision arbitration process only when the pending blocks are registered.

First, at step S201, the arbitration unit F8 determines whether the ECU 1 to which the arbitration unit F8 belongs has a pending block. If there is no pending block, a negative decision is made at step S201 and the process ends. On the contrary, if there is a pending block, an affirmative decision is made at step S201 and the process proceeds to step S202.

At step S202, it is determined whether a verification request is received from an ECU 1 other than the pending block generating source ECU (i.e., the subject ECU). For example, when the verification target block is received from an ECU 1 other than the subject ECU, it is assumed that a block collision has occurred, and the process proceeds to step S203. On the other hand, if the verification target block is not received from an ECU 1 other than the subject ECU, it is assumed that no block collision has occurred, and the flow ends. Therefore, step S202 can be interpreted as a process of determining whether a new verification target block that is different from the pending block has been received.

At step S203, processing is executed to prevent the fork due to block collisions from occurring. For example, the arbitration unit F8 transmits a collision detection message to each of the ECUs 1 to stop the verification process. Further, the arbitration unit F8 may request the ECU 1 that generated the colliding block to re-transmit the block. The generating source ECU of the colliding block transmits the verification request every time a random waiting time has elapsed based on receiving the collision detection message from another ECU 1, a re-transmission request from another ECU 1, or detection of a block collision by itself.

Advantageous Effects of the Above-Described Configuration

According to the above configuration, it is determined whether to connect the newly created block to the blockchain BC based on the majority vote of the plurality of ECUs 1 as reliable nodes. Accordingly, the credibility (in other words, validity) of blocks newly created by a plurality of ECUs 1 is determined, so that the credibility of data stored as a block connected to the blockchain can be enhanced.

In addition, the vehicle data storage system Sys of the present disclosure is not a PoW type blockchain. That is, in the configuration of the present disclosure, each of the ECUs 1 does not need to perform a round-robin search for a nonce value whose hash value satisfies a specific condition (i.e., so-called mining). Therefore, the processing load on the processor 11 can be reduced. Therefore, as computing resources of the processor 11 and the RAM 12, inexpensive electronic components with relatively low performance may be used.

As another configuration using a blockchain that does not require mining (hereinafter, referred to as a comparative example), a centralized type configuration in which only one privileged node generates blocks has been known. However, in such a comparative example, if a failure occurs in the privileged node, the system storing data can be dysfunctional. In addition, in the comparison example, it is assumed that the configuration of the privileged node requires hardware with higher performance and security than normal nodes, which may lead to an increase in cost.

In contrast to the comparative example, the configuration of the present disclosure is not a centralized configuration, and each of the ECUs 1 has a substantially equal right regarding block generation. Specifically, each of the plurality of ECUs 1 as a node has the authority to independently generate a block, and a block generated by one ECU 1 is verified to be connected to the blockchain BC based on the verification results by other ECUs 1. According to such a configuration, even if some of the ECUs 1 fail to operate, the other ECUs 1 can continue to save data. Therefore, according to the configuration of the present disclosure, it is possible to improve robustness against a failure compared to the comparison example.

Further, in the above configuration, each ECU 1 is configured so that, when block collision is detected, the ECU that generated the colliding block re-transmits a block approval request at a timing a random waiting time elapses. This makes it possible to avoid occurrence of the fork without using a privileged node. In other words, it is possible to achieve both improved robustness against failures and the like and prevention of fork generation.

Note that verification of the generated block can be completed in a relatively short time using the common key Ky. For example, the assumed verification required time can be less than 1 second. According to the configuration of the present disclosure, since blocks can be generated at high frequency, it is possible to avoid an increase in data size of transactions included in one block.

Moreover, according to the structure of the above-described embodiment, vehicle data for every domain is distributed and saved by each ECU1. For example, data of the target domain of an ECU 1 is also held by another ECU 1 as a block. Therefore, even if an ECU 1 fails and the stored data of the ECU 1 cannot be extracted, necessary data can be retrieved from other ECUs 1.

In the above description, a new block is determined to be connected to the blockchain BC using the ACK/NACK, but it is not necessarily limited to this example. For example, each ECU 1 may be configured to distribute, to other ECUs, blocks whose validity has been confirmed at the verification process. Then, each ECU 1 may be configured to, when receiving the same blocks from a majority of the ECUs 1, connect the block to the blockchain BC assuming that a majority decision has been obtained. When receiving a block from another ECU 1, each ECU 1 preferably determines whether the currently received block is the same as the block that has been already received based on the block number of the block, information of the generating source of the block, the contents of the transactions, and the like.

Figure 7:
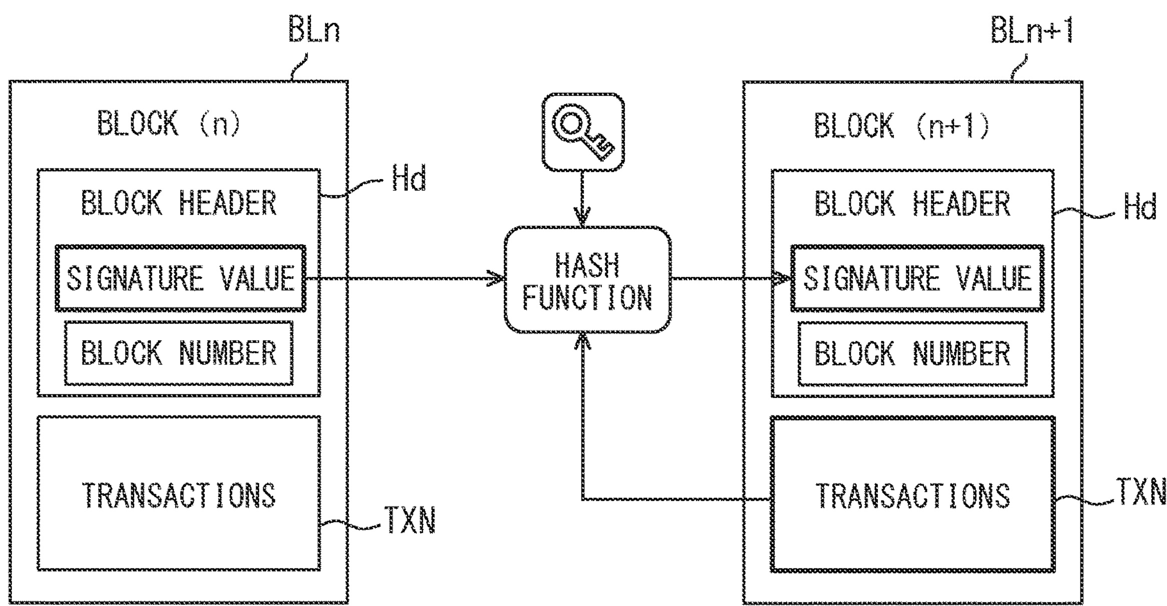
FIG. 7 is a diagram for a block configuration according to a modification example.

As shown in FIG. 3, the signature value included in new block is a value (character string) obtained by encrypting, using the common key Ky, a hash value of original data formed of the transactions TXN of the new block and the signature value of the preceding block, but it is not necessarily limited to this. For example, as shown in FIG. 7, the signature value may be a hash value obtained by inputting the original data including the previous signature value, the common key Ky, and the transactions TXN of the new block into a predetermined hash function. In other words, generation of a new signature value does not need to include an encrypting process using a common key.

In the above case, each ECU 1 inputs a data set formed of the last block signature value held by itself, the common key Ky, and the transactions TXN included in the verification target block into the hash function as verification processing to generate a hash value for verification. Then, when the hash value for verification and the hash value of the signature value included in the verification target block match each other, the block can be determined to be valid (in other words, proper). In other words, if a process such as encryption using a common key is not included when generating a new signature value, there is no need to include a process such as decryption using the common key during the verification processing.

The data set as the original data of the signature value can be, for example, data obtained by combining the previous signature value, the transactions TXN of the new block, and the common key Ky with each other in a predetermined order. Also, the original data may be obtained by encrypting the previous signature value and the transactions TXN of the new block with the common key Ky. That is, the original data should involve the common key Ky in some way, such as combining data strings or multiplying/adding bit strings. The ECU 1 as a verifier is configured to generate a hash value for verification using transactions TXN or the like of the received block by a method similar to the method for generating a hash value as a new signature value. Then, the ECU 1 compares the two hash values to each other.

Also, the block generation condition is not necessarily limited to the above-described example. For example, each ECU 1 may be configured to generate a block at a timing a random waiting time has elapsed since the vehicle stopped. The timing at which the vehicle stops may be interpreted as a “turning point” in the driving scene, and the processing load on the ECU 1 is expected to be decreased as compared to the processing load during driving operation. Therefore, such a turning point is suitable for storing, as a block, data that have been accumulated. On the contrary, if the timing at which the vehicle stops is used as a block generation trigger, a plurality of ECUs 1 will generate blocks at the same time, which would increase the likelihood of occurrence of block collision. In view of such a concern, according to the configuration in which each ECU 1 generates a block at a timing after a random waiting time has elapsed since the vehicle stopped, the ECUs 1 can generate blocks at different timings. As a result, it is possible to reduce the risk of block collisions while setting the block generation timing in a turning point of the driving scene such as when the vehicle stops. It should be noted that a vehicle can be determined to stop based on output signals of various in-vehicle sensors such as a vehicle speed sensor.

Moreover, in the above description, the ECU 1 that generated the new block does not have a voting right in the majority vote for determining whether to connect the new block to the blockchain BC. In other words, the block generating source ECU is not included in the majority vote population for judging the validity of the new block. However, as another aspect, the ECU that generated the new block may have the right to vote for verifying the validity of the newly generated block. In other words, the ECU 1 as the block generating source may be included in the majority vote population for determining whether to connect the new block to the blockchain BC.

Further, whether to grant the voting right to the block generating source of the new block may be decided according to the number of ECUs 1 connected to the network. For example, when the total number of ECUs 1 connected to the network is an even number, the number of ECUs 1 excluding the block generating source is an odd number, which would be convenient in terms of majority rule. Therefore, when the total number of ECUs 1 connected to the network is an even number, the block generating source may not be given a voting right or voting by the block generating source may be invalidated (ignored). On the other hand, if the total number of ECUs 1 connected to the network is an odd number, the number of ECUs 1 excluding the block generating source becomes an even number. Thus, if the total number of ECUs 1 connected to the network is odd, the block generating source may also be given a voting right.

It should be noted that the verification request unit F3, which is a block generating source, does not need to transmit the verification request to all the other ECUs 1 connected to the network. The verification request unit F3 may be configured to select, according to a predetermined rule or at random, ECUs 1 to which verification requests are to be transmitted from among a plurality of ECUs 1 connected to the network. For example, the verification request unit F3 may be configured to adjust the number of ECUs 1 that will receive the verification requests so that the number of ECUs 1 that will verify the verification target block becomes an odd number.

Further, each ECU 1 may be configured to transmit a verification request only to ECUs 1 that have been confirmed as valid terminal devices (that is, their identity confirmed) among the ECUs 1 connected to the network. Each ECU 1 may identify whether other ECUs are the valid terminal devices by performing an authentication process by, for example, a challenge-response method with the other ECUs 1 at the timing the power source of the vehicle is turned on. Alternatively, a white list or the like may be used to verify identification. For example, ECUs 1 registered in the whitelist may be regarded as nodes whose identity have been confirmed, and may be regarded as valid transmission targets for the verification request. The whitelist can be registered, for example, by a worker at a manufacturing plant or a dealer. The whitelist is a list for terminal devices that are permitted to communicate, and the whitelist includes information on MAC addresses, IP addresses, port numbers, etc. of the permitted terminal devices. The whitelist can be included in the concept of an Access Control List (ACL).

In the above description, the common key Ky is stored in a storage area whose security is ensured using the TrustZone technology, but the present disclosure is not necessarily limited to this. The common key Ky may be stored using other storage methods as a storage medium whose security is ensured. For example, the common key Ky may be stored in a NOR-type or NAND-type secure flash memory or the like. Further, the common key Ky may be a code as key information commonly shared by ECUs 1, and may be any character string, numerical value string, or functions. The common key Ky corresponds to data for one ECU 1 to judge validity of other ECUs 1 or blocks. The common key Ky may be a reversible key that can be used for both encryption and decryption, or an irreversible key. Each ECU 1 may share two types of keys, a secret key for encryption and a public key for decryption, as the common key Ky.

In the above description, a random waiting time is used to avoid occurrence of re-collision when block collision occurs, but the present disclosure is not necessarily limited to this. As another aspect, priority is given to each ECU 1, and when a block collision is detected, the verification request from the ECU 1 with relatively higher priority may be used, and the verification request from other ECUs 1 with lower priority may be ignored. Further, when a block collision occurs, all pending blocks may be once discarded by all the ECUs 1, and then the verification requests regarding the newly generated blocks may be retransmitted in order from the ECU 1 having the highest priority. It is preferable that the priority of each ECU 1 is appropriately set in view of the type of data handled by the ECUs 1. For example, data of an AD/ADAS system ECU 1 may be given the highest priority since such data is useful for verification for an accident or the like. The priority of each ECU 1 may be set higher for ECUs that handle data necessary for analyzing the circumstances of an accident and determining which party has responsibility, or the like.

Although in the above-embodiment, each ECU 1 forming a blockchain network is a domain ECU, but the present disclosure is not necessarily limited to this. Each ECU 1 may be a sub-ECU within a domain. That is, the vehicle data storage system Sys of the present disclosure may be constructed within the domain. In addition, the vehicle data storage system Sys of the present disclosure is applicable to vehicles in which domain architecture is not adopted. For example, the system Sys can be applied to currently used vehicles in which the concept of domains has not been introduced, and vehicles adopting zone architecture. Furthermore, the nodes connected to the blockchain network are not limited to ECUs, and various computers can be used. The server Sv may be used as a node.

ADDITIONAL NOTES

The device, the system and the methodology therefor which have been disclosed in the present disclosure may be realized by dedicated computers which constitute processors programmed for executing one or more functions concretized by computer programs. The device and the method thereof described in the present disclosure may be implemented by using a dedicated hardware logic circuit. Alternatively, the device and the method described in the present disclosure may be implemented by one or more special purpose computers configured by a combination of a processor executing a computer program and one or more hardware logic circuits. A computer program may be stored in a computer-readable non-transitory tangible recording medium as an instruction executed by a computer. Namely, the means and/or the functions which are provided by the processor 11 and the like may be provided by software stored in tangible memory devices and computers for executing them, only software, only hardware, or a combination thereof. For example, some or all of the functions provided by the authentication processor may be realized as hardware. A configuration in which a certain function is implemented by hardware includes a configuration in which the function is implemented by use of one or more ICs or the like. The processor 11 may be implemented by using an MPU, a GPU, or a data flow processor (DFP) instead of the CPU. The processor 11 may be realized by combining multiple types of arithmetic processing units such as a CPU, an MPU, and a GPU. The processor 11 may be implemented by using a SoC (System-on-Chip), Further, for example, various processing units may be implemented by using a FPGA (Field-Programmable Gate Array), an ASIC (Application Specific Integrated Circuit), or the like. It should be noted that the various programs described above may be stored in a non-transitory tangible storage medium. As a program storage medium, various storage media such as Hard-disk Drive (HDD), Solid State Drive (SSD), flash memory, and Secure Digital (SD) card can be adopted.

The invention claimed is:

1. A vehicle data storage method that utilizes a blockchain formed by a plurality of blocks to store data collected by a vehicle, the vehicle comprising a plurality of in-vehicle devices as a plurality of nodes, each of the plurality of nodes being configured to communicate with each other and having a common key which is common key information, the method, implemented by each of the plurality of nodes, comprising:

generating, as a new block, a block to be connected to the blockchain, each of the plurality of blocks including transactions as storage target data and a signature value generated using a part of a previous block and the common key, the new block including a new signature value generated using a part of a last block located at an end of the blockchain and the common key;

requesting other nodes of the plurality of nodes to verify the new block by distributing the new block to the other nodes upon generating the new block;

verifying, using the common key, validity of a new block generated by, and distributed from, one of the other nodes when requested by the one of the other nodes and transmitting a verification result to at least the one of the other nodes that requested for verification;

connecting the new block to the blockchain when a majority of the plurality of nodes determines that the new block is valid; and for a state in which two new blocks are generated by two nodes among the plurality of nodes and verification requests on the two new blocks are made by the two nodes at a substantially same time, re-transmitting, by at least one of the two nodes, a verification request at random or when a predetermined time has elapsed, wherein the vehicle data storage method further comprises:

in response to generating the new block, selecting three or more other nodes from the plurality of nodes in accordance with a predetermined rule or at random;

transmitting a verification request to the selected three or more other nodes of the plurality of nodes to verify the new block by distributing the new block to the three or more other nodes upon generating the new block;

connecting the new block to the blockchain when a majority of the three or more other nodes to which the verification request was transmitted determines that the new block is valid; and when a total number of the three or more other nodes to which the verification request was transmitted is even, giving a voting right to determine the majority to the node that generated the new block.

2. The vehicle data storage method according to claim 1, further comprising for a state in which two new blocks are generated by two nodes among the plurality of nodes and verification requests on the two new blocks are made by the two nodes at a substantially same time, re-transmitting, by each of the two nodes, a verification request when a random time has elapsed.

3. The vehicle data storage method according to claim 1, wherein a priority order is set for each of the plurality of nodes, and the method further comprises, for a state in which two new blocks are generated by two nodes among the plurality of nodes and verification requests on the two new blocks are made by the two nodes at a substantially same time:

verifying one of the two blocks generated by one of the two nodes that has a higher priority order; and cancelling the other of the two blocks generated by the other of the two nodes that has a lower priority order.

4. The vehicle data storage method according to claim 1, further comprising:

generating a hash value by inputting the signature value included in the last block and the transactions to be included in the new block into a predetermined hash function; and using, as the signature value of the new block, a value obtained by encrypting the generated hash value using the common key.

5. The vehicle data storage method according to claim 1, further comprising generating, by each of the plurality of nodes, the new block when a random time has elapsed since the vehicle stopped.

6. The vehicle data storage method according to claim 1, further comprising requesting, by one of the plurality of nodes, an odd number of other nodes among the plurality of nodes to verify the new block by distributing the new block to the odd number of the other nodes upon generating the new block.

7. The vehicle data storage method according to claim 1, further comprising uploading, by one of the plurality of nodes, the plurality of blocks connected to the blockchain to a server located outside of the vehicle via a transmitter that is configured to perform wireless communication.

8. A vehicle data storage system that utilizes a blockchain formed by a plurality of blocks to store data collected by a vehicle, the vehicle comprising a plurality of in-vehicle devices, the vehicle data storage system comprising:

a plurality of nodes that are configured to collect data and communicate with each other, each of the plurality of nodes having a common key that is common key information, each of the plurality of in-vehicle devices comprising one of the plurality of nodes, wherein each of the plurality of nodes includes:

a block generation unit that is configured to generate, as a new block, a block to be connected to the blockchain, each the plurality of blocks including transactions as storage target data and a signature value generated using a part of a previous block and the common key, the new block including a new signature value generated using a part of a last block located at an end of the blockchain and the common key;

a verification request unit that is configured to request other nodes of the plurality of nodes to verify the new block by distributing the new block to the other nodes upon generating the new block;

a block verification unit that is configured to verify, using the common key, validity of a new block generated by, and distributed from, one of the other nodes when requested by the one of the other nodes and to transmit a verification result to at least the one of the other nodes that generated and distributed the new block;

a blockchain update unit that is configured to connect the new block to the blockchain when a majority of the plurality of nodes determines that the new block is valid; and an arbitration unit that is configured to re-transmit a verification request on the new block at random or when a predetermined waiting time has elapsed for a state in which a subject node of the plurality of nodes and one of other nodes of the plurality of nodes make verification requests at a substantially same time, wherein the vehicle data storage system further comprises:

in response to generating the new block, selecting three or more other nodes from the plurality of nodes in accordance with a predetermined rule or at random;

transmitting a verification request to the selected three or more other nodes of the plurality of nodes to verify the new block by distributing the new block to the three or more other nodes upon generating the new block;

connecting the new block to the blockchain when a majority of the three or more other nodes to which the verification request was transmitted determines that the new block is valid; and when a total number of the three or more other nodes to which the verification request was transmitted is even, giving a voting right to determine the majority to the node that generated the new block.

9. A vehicle data storage system that utilizes a blockchain formed by a plurality of blocks to store data collected by a vehicle, the vehicle comprising a plurality of in-vehicle devices, the vehicle data storage system comprising:

a plurality of nodes that are configured to collect data and communicate with each other, each of the plurality of nodes having a common key that is common key information, each of the plurality of in-vehicle devices comprising one of the plurality of nodes, wherein each of the plurality of nodes includes at least one processor programmed to:

generate, as a new block, a block to be connected to the blockchain, each the plurality of blocks including transactions as storage target data and a signature value generated using a part of a previous block and the common key, the new block including a new signature value generated using a part of a last block located at an end of the blockchain and the common key;

request other nodes of the plurality of nodes to verify the new block by distributing the new block to the other nodes upon generating the new block;

verify, using the common key, validity of a new block generated by, and distributed from, one of the other nodes when requested by the one of the other nodes and to transmit a verification result to at least the one of the other nodes that generated and distributed the new block;

connect the new block to the blockchain when a majority of the plurality of nodes determines that the new block is valid; and re-transmit a verification request on the new block at random or when a predetermined waiting time has elapsed for a state in which a subject node of the plurality of nodes and one of other nodes of the plurality of nodes make verification requests at a substantially same time, wherein the vehicle data storage system further comprises:

in response to generating the new block, selecting three or more other nodes from the plurality of nodes in accordance with a predetermined rule or at random;

transmitting a verification request to the selected three or more other nodes of the plurality of nodes to verify the new block by distributing the new block to the three or more other nodes upon generating the new block;

connecting the new block to the blockchain when a majority of the three or more other nodes to which the verification request was transmitted determines that the new block is valid; and when a total number of the three or more other nodes to which the verification request was transmitted is even, giving a voting right to determine the majority to the node that generated the new block.

10. The vehicle data storage method according to claim 1, further comprising when a total number of the three or more other nodes to which the verification request was transmitted is odd, not giving a voting right to determine the majority to the node that generated the new block.

11. The vehicle data storage method according to claim 1, further comprising transmitting the verification request only to the three or more other nodes that have been confirmed as valid vehicle devices.

12. The vehicle data storage method according to claim 1, wherein the majority of the plurality of nodes determines that the new block is valid when 51% or more of the plurality of nodes constituting the system recognize the new block is valid.

* * * * *